(12) United States Patent
Kraley

(10) Patent No.: US 11,769,072 B2
(45) Date of Patent: Sep. 26, 2023

(54) DOCUMENT STRUCTURE EXTRACTION USING MACHINE LEARNING

(71) Applicant: Adobe Inc., San Jose, CA (US)

(72) Inventor: Michael Kraley, Lexington, MA (US)

(73) Assignee: Adobe Inc., San Jose, CA (US)

( * ) Notice: Subject to any disclaimer, the term of this patent is extended or adjusted under 35 U.S.C. 154(b) by 1469 days.

(21) Appl. No.: 15/231,294

(22) Filed: Aug. 8, 2016

(65) Prior Publication Data

US 2018/0039907 A1    Feb. 8, 2018

(51) Int. Cl.
*G06N 20/00* (2019.01)
*G06N 5/02* (2023.01)
*G06V 30/414* (2022.01)
*G06F 18/2413* (2023.01)

(52) U.S. Cl.
CPC ....... *G06N 20/00* (2019.01); *G06F 18/24133* (2023.01); *G06N 5/02* (2013.01); *G06V 30/414* (2022.01)

(58) Field of Classification Search
CPC .. G06N 20/00; G06K 9/00463; G06K 9/4628; G06K 9/6271
See application file for complete search history.

(56) References Cited

U.S. PATENT DOCUMENTS

| | | | |
|---|---|---|---|
| 6,418,434 B1* | 7/2002 | Johnson | G06F 16/334 |
| 7,793,224 B1* | 9/2010 | Ayers | G06F 17/211 |
| | | | 715/249 |
| 7,930,322 B2 | 4/2011 | MacLennan | |
| 9,317,777 B2* | 4/2016 | Kaasila | G06K 9/6215 |
| 9,411,790 B2* | 8/2016 | McKinney | G06F 17/2247 |
| 2004/0024769 A1* | 2/2004 | Forman | G06K 9/6282 |
| 2006/0277173 A1* | 12/2006 | Li | G06F 17/211 |

(Continued)

OTHER PUBLICATIONS

"Adobe Acrobat 8 Standard User Guide", Adobe Systems Incorporated, retrieved from https://help.adobe.com/archive/en_US/acrobat/8/standard/acrobat_8_help.pdf, Contents & Chapter 1, pp. i-11 (2007).

(Continued)

*Primary Examiner* — Omar F Fernandez Rivas
*Assistant Examiner* — Tri T Nguyen
(74) *Attorney, Agent, or Firm* — FINCH & MALONEY PLLC

(57) ABSTRACT

The structure of an untagged document can be derived using a predictive model that is trained in a supervised learning framework based on a corpus of tagged training documents. Analyzing the training documents results in a plurality of document part feature vectors, each of which correlates a category defining a document part (for example, "title" or "body paragraph") with one or more feature-value pairs (for example, "font=Arial" or "alignment=centered"). Any suitable machine learning algorithm can be used to train the predictive model based on the document part feature vectors extracted from the training documents. Once the predictive model has been trained, it can receive feature-value pairs corresponding to a portion of an untagged document and make predictions with respect to the how that document part should be categorized. The predictive model can therefore generate tag metadata that defines a structure of the untagged document in an automated fashion.

16 Claims, 5 Drawing Sheets

(56) References Cited

U.S. PATENT DOCUMENTS

| | | | | |
|---|---|---|---|---|
| 2007/0250770 | A1* | 10/2007 | Gu | G06F 40/226 715/210 |
| 2010/0082642 | A1* | 4/2010 | Forman | G06F 16/35 707/749 |
| 2012/0110438 | A1* | 5/2012 | Peraza | G06F 17/214 715/243 |
| 2012/0179633 | A1* | 7/2012 | Ghani | G06F 16/35 706/12 |
| 2012/0278705 | A1* | 11/2012 | Yang | G06F 16/38 715/254 |
| 2012/0310868 | A1* | 12/2012 | Martins | G06F 16/313 706/12 |
| 2013/0174017 | A1* | 7/2013 | Richardson | G06F 40/10 715/234 |
| 2014/0164911 | A1* | 6/2014 | Nickolov | G06F 40/106 715/243 |
| 2016/0078022 | A1* | 3/2016 | Lisuk | G06F 16/353 706/12 |
| 2016/0124922 | A1* | 5/2016 | Wu | G06F 16/957 715/234 |
| 2016/0275147 | A1* | 9/2016 | Morimoto | G06F 16/2457 |
| 2016/0307067 | A1* | 10/2016 | Filimonova | G06K 9/00442 |
| 2016/0342578 | A1* | 11/2016 | McKinney | G06F 40/117 |

OTHER PUBLICATIONS

"Adobe Acrobat 8 Standard User Guide", Adobe Systems Incorporated, retrieved from https://help.adobe.com/archive/en_US/acrobat/8/standard/acrobat_8_help.pdf, Chapter 2, pp. 12-52 (2007).
"Adobe Acrobat 8 Standard User Guide", Adobe Systems Incorporated, retrieved from https://help.adobe.com/archive/en_US/acrobat/8/standard/acrobat_8_help.pdf, Chapter 3, pp. 53-80 (2007).
"Adobe Acrobat 8 Standard User Guide", Adobe Systems Incorporated, retrieved from https://help.adobe.com/archive/en_US/acrobat/8/standard/acrobat_8_help.pdf, Chapter 3, pp. 81-108 (2007).
"Adobe Acrobat 8 Standard User Guide", Adobe Systems Incorporated, retrieved from https://help.adobe.com/archive/en_US/acrobat/8/standard/acrobat_8_help.pdf, Chapters 4-5, pp. 109-139 (2007).
"Adobe Acrobat 8 Standard User Guide", Adobe Systems Incorporated, retrieved from https://help.adobe.com/archive/en_US/acrobat/8/standard/acrobat_8_help.pdf, Chapters, pp. 140-182 (2007).
"Adobe Acrobat 8 Standard User Guide", Adobe Systems Incorporated, retrieved from https://help.adobe.com/archive/en_US/acrobat/8/standard/acrobat_8_help.pdf, Chapters 7-8, pp. 183-218 (2007).
"Adobe Acrobat 8 Standard User Guide", Adobe Systems Incorporated, retrieved from https://help.adobe.com/archive/en_US/acrobat/8/standard/acrobat_8_help.pdf, Chapters 9-10, pp. 219-246 (2007).
"Adobe Acrobat 8 Standard User Guide", Adobe Systems Incorporated, retrieved from https://help.adobe.com/archive/en_US/acrobat/8/standard/acrobat_8_help.pdf, Chapters 11-12, pp. 247-287 (2007).
"Adobe Acrobat 8 Standard User Guide", Adobe Systems Incorporated, retrieved from https://help.adobe.com/archive/en_US/acrobat/8/standard/acrobat_8_help.pdf, Chapters 13-14, pp. 288-324 (2007).
"Adobe Acrobat 8 Standard User Guide", Adobe Systems Incorporated, retrieved from https://help.adobe.com/archive/en_US/acrobat/8/standard/acrobat_8_help.pdf, Chapter 15, pp. 325-335 (2007).
"Adobe Acrobat 8 Standard User Guide", Adobe Systems Incorporated, retrieved from https://help.adobe.com/archive/en_US/acrobat/8/standard/acrobat_8_help.pdf, Chapter 16, pp. 336-377 (2007).
"Adobe Acrobat 8 Standard User Guide", Adobe Systems Incorporated, retrieved from https://help.adobe.com/archive/en_US/acrobat/8/standard/acrobat_8_help.pdf, Chapter 17 and Index, pp. 378-384 (2007).
Debenu PDF Aerialist(TM) User Guide (Version 12), Debenu PDF Technology, retreived from <http://www.debenu.com/wp-content/uploads/DebenuPDFAerialistUserGuide-pdf> on Jan. 27, 2016.
"Automatically Build PDF Table of Contents", Debenu PDF Technology, retreived from <http://www.debenu.com/products/desktop/debenu-pdf-aerialist/features/automatically-build-table-of-contents/> on Jan. 27, 2016.

* cited by examiner

FIG. 2

Untagged Document (10) → Predictive Model (264) → Tag Metadata (20)

Document Part Feature Vectors (266)

| Part Index | Category | Feature-Value Pairs |
|---|---|---|
| 1 | title | font size = largest; alignment = center |
| 2 | body paragraph | font size = most common; alignment = justified |
| 3 | heading (1st level) | bold = true; underline = single |

| Part Index | Category | Feature-Value Pairs |
|---|---|---|
| 1 | list item | indent = 10%; first character = bullet |
| 2 | heading (3rd level) | italic = true; font size = 110% of normal |
| 3 | subtitle | font size = second-largest; spacing after = 12 points |

| Part Index | Category | Feature-Value Pairs |
|---|---|---|
| 1 | footnote | font size = 80%; first character = number |
| 2 | caption | font size = 100% of normal; alignment = center |
| 3 | block quote | left indent = 15%; right indent = 15% |

Training Documents (50): Tagged Document (50a), Tagged Document (50b), Tagged Document (50c), ...

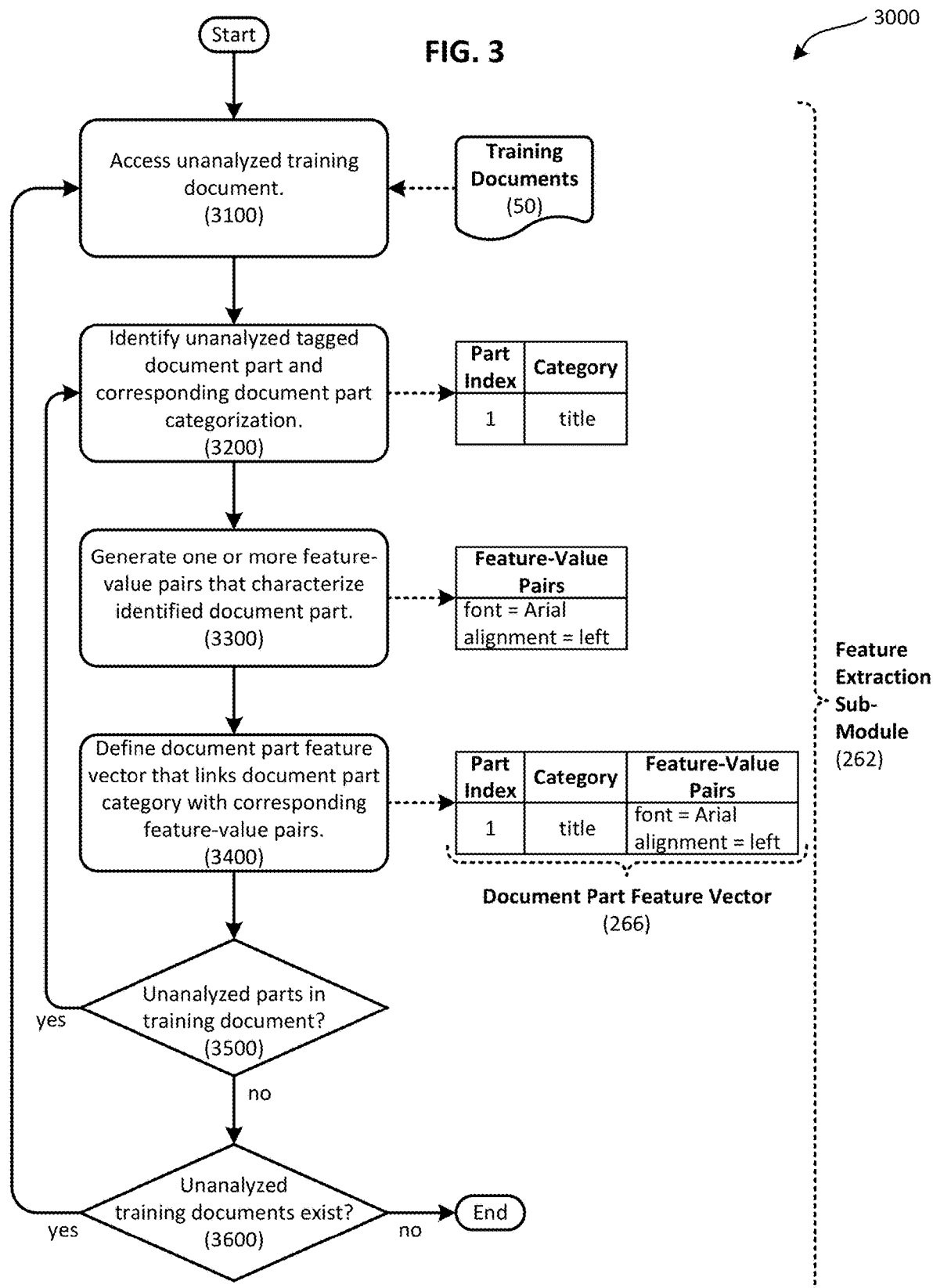

DOCUMENT STRUCTURE EXTRACTION USING MACHINE LEARNING

FIELD OF THE DISCLOSURE

This application relates generally to automated analysis of electronic documents, and more specifically to automated techniques for deriving the structure of an electronic document using machine learning models.

BACKGROUND

Electronic documents have become an increasingly indispensable part of modern life, and in many contexts have completely replaced conventional paper documents. Among the many advantages that electronic documents offer is the ability to quickly search and index document content, thus generally making it far easier to locate information in a collection of electronic documents than in a corresponding collection of paper documents. Indeed, many of the software tools used to create and manipulate electronic documents, such as word processing and desktop publishing applications, allow users to define a hierarchical structure for an electronic document, thus facilitating automated indexing and searching operations performed on the document content. For example, an electronic document may comprise multiple chapters, each of which in turn may comprise multiple sections, each of which in turn may comprise multiple subsections, and so forth. Such a document comprises a plurality of document parts which collectively define a document structure. In many cases, a given document part will be associated with distinctive typography or visual cues, such as such a typeface, typestyle (for example, bold and/or italic), type size, color, underlining, vertical spacing, indentation, labeling, section headings, and the like. In some cases document parts are also designated using metadata, such as in hypertext markup language (HTML) documents where heading tags <h1>, <h2>, <h3>, and so forth are used. Applying distinctive visual cues to particular document parts makes it easy for a reader to intuitively discern the document organization at a glance. The organization of a document can also be expressly stated using a construct such as a table of contents or an outline. In general, people often find it easier to navigate and understand a document if its organization is readily discernable.

BRIEF DESCRIPTION OF THE DRAWINGS

FIG. 2 is a data flow diagram schematically illustrating an example technique for using a plurality of tagged training documents to train a predictive model that can subsequently be used to generate tag metadata corresponding to an untagged document.

FIG. 3 is a flowchart illustrating an example method for using a plurality of tagged training documents to train a predictive model that can subsequently be used to generate tag metadata corresponding to an untagged document.

DETAILED DESCRIPTION

Figure 1:
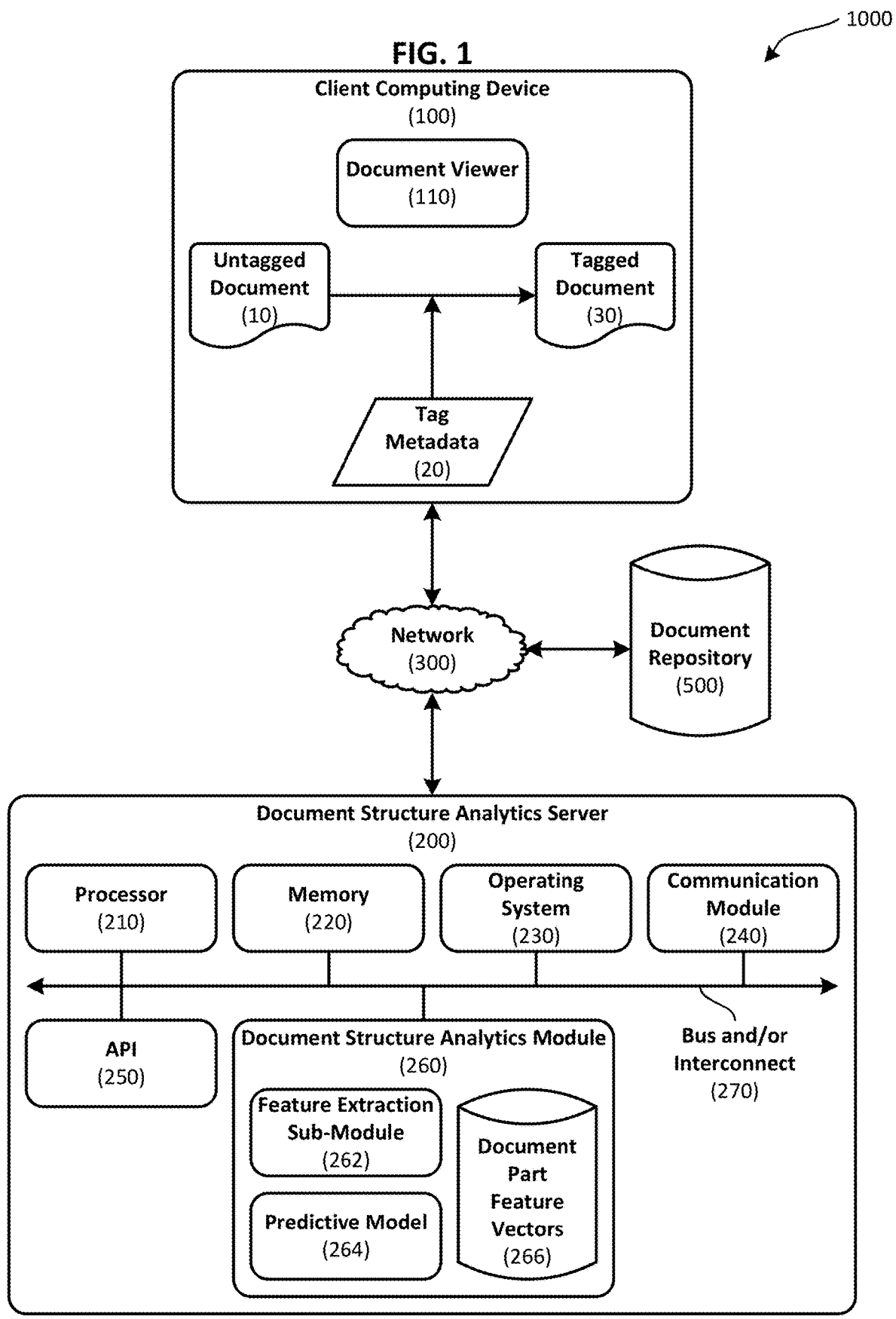
FIG. 1 is a block diagram illustrating selected components of an example document structure evaluation framework that allows the structure of an untagged document to be derived using a predictive model.

As noted above, electronic documents often comprise a plurality of document parts, each of which are associated with distinctive typography or visual cues. In many cases document parts are expressly defined using metadata or "tags" that correlate a particular document part with a particular visual appearance or style. When the document is rendered, the various document parts are evident based on the corresponding visual appearance. Thus, tags can be understood as defining a document structure in terms of the typographical elements that distinguish the various document parts. While tags are widely used to define document structure, many documents are "untagged", and thus do not include any express indication of the various document parts which are defined by the typographical features present in the document. It should be appreciated that an untagged document is not necessarily unformatted—the formatting features may exist without expressly being correlated with specific document parts. Untagged documents are often created when a tagged document is converted to a different document format, such as a publishable or portable document format (PDF). This may occur, for example, when a word processing document is converted to a PDF file. Untagged documents are also created when a document author applies formatting features to a document without using tags to expressly define the various document parts to which the formatting features are applied. Many software applications rely on the presence of tags in a document to invoke automated document processing operations, such as creating a table of contents, generating a document outline, building a navigation structure, indexing document content, collapsing/expanding document content, reflowing document content, performing content comparison operations, or defining a set of hierarchical bookmarks. Such operations generally cannot be applied to an untagged document without first receiving user input to define the document parts. Manually tagging documents is a time-consuming and imprecise undertaking, and thus is not considered a feasible solution.

Based on the foregoing, and in accordance with certain of the embodiments disclosed herein, automated techniques for deriving the structure of an untagged electronic document have been developed. In particular, the structure of an untagged document can be derived using a predictive model that is trained in a supervised learning framework based on a corpus of tagged training documents. Analyzing the training documents results in a plurality of document part feature vectors, each of which correlates a category defining a document part (for example, "title" or "body paragraph") with one or more feature-value pairs (for example, "font=Arial" or "alignment=centered"). Any suitable machine learning algorithm can be used to train the predictive model based on the document part feature vectors extracted from the training documents. Once the predictive model has been trained, it can receive feature-value pairs corresponding to a portion of an untagged document and make predictions with respect to how that document part should be categorized. The predictive model can therefore generate tag metadata that defines a structure of the untagged document in an automated fashion. A wide range of alternative embodiments will be apparent in light of this disclosure.

Using a predictive model to categorize the parts of an untagged document allows the document structure to be derived without user input, thus reducing tedious, imprecise, and often inconsistent manual tagging of documents. More specifically, the structure of the untagged document is derived by classifying the constituent parts of the document based on the formatting and stylistic attributes of those document parts. These predictions can be made independently of the actual textual content of the analyzed document. Stated alternatively, the classification predictions are made based on how the text appears, as opposed to what the text says. Such a technique can be applied, for example, in conjunction with document processing operations that leverage document structure, such as creating a table of contents, generating a document outline, building a navigation structure, indexing document content, reflowing document content, and defining a set of hierarchical bookmarks. The techniques disclosed herein enable these operations to be applied to untagged documents, which heretofore would have required user input to define the document structure as an initial step. Such user input represents a laborious and imprecise process that can be avoided by automating the tagging process. The techniques disclosed herein can therefore be understood as producing metadata that defines a document structure. These and other advantages will be apparent in view of the disclosure provided herein.

As used herein, the terms "document" and "electronic document" both refer, in addition to their respective ordinary meanings, to any collection of digital information that can be accessed and rendered using a computing device. A document can be rendered in a variety of different ways, such as via display on a screen, by printing using an output device, or aurally using an audio player and text-to-speech software. A document may include digital assets in addition to or instead of text, such as, for example, audio clips, video clips, photographs, and other multimedia assets. Documents may encompass a virtually unlimited range of subject matter, and may be encoded in a virtually unlimited range of file formats. Example file formats include word processing documents (such as documents conforming to the .docx standard) and documents used to render content in a way that is independent of software and hardware (such as documents conforming to the .pdf standard). Documents may be communicated amongst users and systems by a variety of techniques, including wired and wireless transmission of digital data.

A document may comprise a plurality of "document parts", or more simply, "parts". As used herein, a document part is a subsection of a document having a distinctive visual appearance, such that when the document is rendered, the various document parts are distinguishable based on their visual appearance. Document parts can be categorized with commonly understood labels such as "title", "paragraph", "list item", and "heading 1". Human readers identify document part categorizations by seeing typographic features, such as font size, indentation, and decorations. But for software applications to interact with and manipulate document parts, it is useful to expressly define a "tag" that associates a particular document part with a particular categorization. Such tags may collectively be referred to as "tag metadata". A document having document parts that are labeled with a corresponding categorization is referred to a "tagged" document. On the other hand, a document that includes only the formatting instructions that define the visual appearance of the various document parts, and that does not include any document part categorization data, is referred to as an "untagged" document. Thus in certain implementations a tagged document includes embedded metadata that identifies documents parts by their categorization.

The visual appearance of a given document part can be defined by one or more "feature-value pairs" which associate a particular value with a particular formatting feature. Example feature-value pairs include "font=Courier" and "alignment=right". Tag metadata can be understood as defining a particular categorization in terms of one or more feature value pairs. For example, the document part categorization "title" can be defined as content having "font=Arial", "font size=18 points", and "alignment=centered".

As used herein, the term "data structure" refers broadly, in addition to its ordinary meaning, to a way of storing and organizing data in a computer accessible memory so the data can be used by an application or software module. In its simplest form, a data structure can be, for example, a set of one or more memory locations. In some cases, a data structure may be implemented as a record, sometimes referred to as a struct to tuple, and may have any appropriate number of fields, elements, or storage locations. As will be further appreciated, a data structure may include data of interest or a pointer that refers to a memory location where the data of interest can be found. A data structure may have any appropriate format such as, for example, a lookup table or index format; an array format; a hash table format; a graph, tree or hierarchical format having a number of nodes; an object format that includes data fields, for instance similar to a record; or a combination of the foregoing. A data structure may include executable code for accessing and modifying the underlying structure and format of the data stored thereon. In a more general sense, the data structure may be implemented as a data set that can store specific values without being constrained to any particular order or format. In one embodiment, a data structure comprises a collection of document part feature vectors, each of which correlates a document part categorization with one or more feature-value pairs. In another embodiment, a data structure comprises tag metadata that correlates observed document parts with a predicted document part categorization. Numerous other data structure formats and applications will be apparent in light of this disclosure.

System Architecture

FIG. 1 is a block diagram illustrating selected components of an example document structure evaluation framework 1000 that allows the structure of an untagged document 10 to be derived using a predictive model 264. In framework 1000, a document viewer 110 executing on a client computing device 100 is capable of accessing services and resources provided by a document structure analytics server 200. More specifically, server 200 hosts predictive model 264, which is capable of generating tag metadata 20 that document viewer 110 can use to transform untagged document 10 into a tagged document 30. Client computing device 100 and document structure analytics server 200 communicate with each other via a network 300. Network 300 can also be used to access optional supplementary resources such as a document repository 500 from which untagged document 10 can be retrieved, and in which tagged document 30 can be stored. Document repository 500 also optionally hosts training documents which can be used to train predictive model 264. Other embodiments may invoke fewer or more devices and resources depending on the granularity of a particular implementation. For example, in an alternative implementation the functionality provided by document structure analytics server 200 is provided locally at client computing device 100, thus eliminating any need for a networked implementation and enabling client computing device 100 to operate in a standalone fashion. The various embodiments disclosed herein therefore are not limited to provision or exclusion of any particular devices or resources.

In certain embodiments client computing device 100 comprises a desktop computer, a laptop computer, a workstation, a tablet computer, a smartphone, a handheld computer, a set-top box, or an enterprise class device. Client computing device 100 may also comprise any other computing device or combination of devices that is capable of supporting the functionality provided by document viewer 110 and interfacing with document structure analytics server 200. In general, client computing device 100 will be understood as including software configured to implement the various functionalities disclosed herein, including an operating system, device drivers, and document viewer 110. In one embodiment, document viewer 110 comprises a word processor, examples of which include Microsoft Word (Microsoft Corp., Redmond, Wash.) and WordPerfect (Corel Corp., Ottawa, Canada). In another embodiment document viewer 110 comprises a web browser, examples of which include Google Chrome (Google Inc., Mountain View, Calif.) and Firefox (Mozilla Foundation, Mountain View, Calif.). In yet another embodiment document viewer 110 comprises a reader such as Adobe Acrobat Reader DC (Adobe Systems Incorporated, San Jose, Calif.).

Referring still to the example embodiment illustrated in FIG. 1, document structure analytics server 200 can be configured to generate a plurality of document part feature vectors 266 based on analysis of a corpus of training documents. Document part feature vectors 266 correlate a category defining a document part (for example, "title" or "body paragraph") with one or more feature-value pairs (for example, "font=Arial" or "alignment=centered"). Document part feature vectors 266 are used to train predictive model 264. Once trained, predictive model 264 can receive feature-value pairs corresponding to a part of untagged document 10 and make predictions with respect to the how that document part should be categorized. To this end, document structure analytics server 200 comprises any suitable computing device capable of supporting such functionality. In one embodiment, document structure analytics server 200 comprises an enterprise class server that includes one or more modules configured to implement certain of the functionalities disclosed herein, and optionally further includes hardware configured to enable such implementation. Examples of enabling hardware include a processor 210, a memory 220, a communication module 240, and a bus and/or interconnect 270. Examples of implementing software include an operating system 230, an application programming interface 250, and a document structure analytics module 260. Additional or alternative enabling hardware and implementing software can be used in other embodiments.

Processor 210 comprises any suitable processor, and may include one or more coprocessors or controllers, such as an audio processor or a graphics processing unit, to assist in processing operations of document structure analytics server 200. Memory 220 is implemented using any suitable type of digital storage, such as one or more of a disk drive, a redundant array of independent disks (RAID), a universal serial bus (USB) drive, flash memory, random access memory (RAM), or any suitable combination of the foregoing. Thus in certain embodiments memory 220 comprises a distributed system of multipole digital storage devices, one or more of which may be remotely located and accessible via network 300. Memory optionally hosts a repository of document part feature vectors 266 which are used to train predictive model 264.

Operating system 230 comprises any suitable operating system, such as Unix, Linux, Microsoft Windows (Microsoft Corp., Redmond, Wash.), Google Android (Google Inc., Mountain View, Calif.), Apple iOS (Apple Inc., Cupertino, Calif.), or Apple OS X (Apple Inc., Cupertino, Calif.). As will be appreciated in light of this disclosure, the techniques provided herein can be implemented without regard to the particular operating system provided in conjunction with document structure analytics server 200, and therefore may also be implemented using any suitable existing or subsequently developed platform. Communication module 240 comprises any appropriate network chip or chipset which allows for wired or wireless communication via network 300 to external components and devices, such as client computing device 100 and document repository 500. Communication module 240 can also be configured to provide intra-device communications via bus and/or interconnect 270.

Application programming interface 250 enables document structure analytics server 200 to interact with client computing device 100, and more specifically, with document viewer 110. For example, in one implementation application programming interface 250 receives untagged document 10, or one or more document pats that comprise untagged document 10, from document viewer 110. The received digital content can be further analyzed by document structure analytics module 260, as will be described in turn. Application programming interface 250 also enables document structure analytics server 200 to interact with and receive digital assets directly from a networked storage resource, such as document repository 500. This is useful where a corpus of training documents is stored in document repository 500. This is also useful in applications where untagged document 10 is to be retrieved directly from document repository 500, thus rendering document viewer 110 optional. In addition to these examples of accessing data, application programming interface 250 can also be used to provide tag metadata 20 to document viewer 110, thus enabling document viewer 110 to present suggested categorizations for the various document parts that comprise untagged document 10. It will be appreciated that the functionality described herein can be implemented using a wide range of existing or subsequently developed routine definitions, protocols, libraries, and commands that enable one software application to interact with another.

Document structure analytics module 260 comprises instructions encoded on a computer readable medium that, when executed using a processor, cause a document structure analysis process to be carried out. The document structure analysis process can be implemented to train predictive model 264, as well as to apply the trained predictive model 264 to generate tag metadata 20 corresponding to untagged document 10. Thus document structure analytics module 260 can be understood as having at least two modes of operation.

FIG. 2 is a data flow diagram schematically illustrating an example technique for using a plurality of tagged training documents 50 to train predictive module 264. Predictive module 264 can subsequently be used to generate tag metadata 20 corresponding to untagged document 10. More specifically, in one particular implementation, training documents 50 are provided as an input to document structure analytics module 260. Training documents 50 comprise a plurality of tagged documents 50*a*, 50*b*, 50*c*, . . . . In some cases training documents 50 comprise a specific set of documents selected based on a type or characteristic of untagged document 10 for which the structure is to be derived. For example, where the structure of untagged documents 10 produced by a specific author is to be determined, training documents 50 may comprise only tagged documents produced by the specific author. As another example, where untagged document 10 relates to patent applications, training documents 50 may comprise only tagged documents that also relate to patent applications. In some cases, providing a more focused corpus of training documents 50 allows more accurate predictions to be made regarding untagged document 10.

Training documents 50 are provided to a feature extraction sub-module 262 which is configured to generate a plurality of document part feature vectors 266. In an example embodiment, feature extraction sub-module 262 comprises instructions encoded on a computer readable medium that, when executed using a processor, cause a feature extraction process to be carried out. Each document part feature vector 266 generated by feature extraction sub-module 262 can be understood as a data structure that correlates a category defining a document part (for example, "title" or "body paragraph") with one or more feature-value pairs (for example, "font=Arial" or "alignment=centered"). Examples of formatting features which are represented by feature-value pairs include font size, typeface, typeface family, font style, text color, underlining type, paragraph length, spacing before/after a paragraph, line spacing, paragraph styles, capitalization, leading characters (such as bullets, letters, or numbers), and indentation. Thus the training process disclosed herein can be understood as using extracted feature-value pairs and corresponding document part categorizations to produce predictive model 264, which can, in turn, be used to categorized untagged document parts.

In general, a wide range of different metrics can be used to represent the formatting features that define the visual appearance of a particular document part. For instance, in some cases an "absolute metric" is used to associate a specific value with a specific formatting feature. Examples of feature-value pairs that use absolute metrics include "alignment=left" and "line spacing=1.5". In other cases, a "normalized metric" defines a specific formatting feature as a ratio of an established baseline. Examples of feature-value pairs that use normalized metrics include "font size=120% of most common font size" and "left margin=1.5 cm larger than most common left margin". In still other cases, an "ordinal metric" defines a specific formatting feature in ordered comparison to other analogous formatting features in the same document. Examples of feature-value pairs that use ordinal metrics include "left indent=second-largest in document" and "font size=largest in document". Ordinal metrics are often useful in distinguishing, for example, body paragraphs (often comprising 90% or more of the text of a document) from headings and/or titles (often comprising 10% or less of the text of a document). And in still other cases a "positionally relative" metric defines a specific formatting feature in comparison to analogous formatting features of adjacent content in the same document. Examples of feature-value pairs that use positionally relative metrics includes "line spacing=smaller than preceding paragraph" and "font size=larger than preceding and following paragraphs". In general, defining a formatting feature in terms of something other than an absolute value is particularly useful in the context of arbitrarily named features, such as font names, as contrasted with measured features, such as font size.

In one implementation a feature-value pair can be generated wherein the feature is "document proportion" and the value is a percentage. Document part feature vector 266 can then be used to associate such a feature-value pair with a particular document part categorization. For example, document part categorization "title" is associated with a feature-value pair "document proportion=less than 0.1% of document content".

In certain embodiments font size or other formatting parameters are defined in both relative and absolute terms. For example, in one implementation a document part characterized as a "level 2 heading" or "section title" is defined has having a font size that is "larger than the following paragraph", "larger than the preceding and following paragraphs", "at least 4 points larger than the following paragraph", or "at least 10% larger than the following paragraph". In another implementation, a document part characterized as "title" is observed as having the largest font size in the document, a document part characterized as "level 1 heading" is characterized as having the second-largest font size, a document part characterized as "level 2 heading" is characterized as having the third-largest font size, and so forth. In general, documents features which relate to measurement, such as line spacing, paragraph before/after spacing, indentation, and the like can be defined in relative (as contrasted with absolute) terms. Defining document parts in relative terms advantageously reduces the sensitivity of predictive model 264 to slight absolute variations in, for example, font size, and thus further enhances the overall accuracy of the predictions made by document structure evaluation framework 1000.

Because a given one of the training documents 50 is likely to produce a plurality of document part feature vectors 266, such vectors are optionally indexed. In one embodiment, document part feature vectors 266 are stored in a repository that is hosted by document structure analytics server 200. In such embodiments, document part feature vectors 266 are used, in conjunction with any suitable machine learning algorithm, to train predictive model 264. Example machine learning algorithms that can be used in this regard include linear classifiers, multinomial logistic regression algorithms, support vector machines, linear discriminant analysis tools, neural networks, heuristic techniques, and the like. In general, the machine learning algorithms referred to herein will be understood as being capable of deriving probabilistic inferences from data using decision trees, clustering, neural networks, Bayesian models, and other techniques. The user can optionally provide input to review, approve, and provide feedback to the probabilistic model, as will be described in turn.

Once predictive model 264 has been adequately trained, it can receive feature-value pairs corresponding to a portion of untagged document 10 and make predictions with respect to how that document part should be categorized. FIG. 2 also schematically illustrates certain data flows that occur in an example implementation wherein document structure analytics module 260 is used to apply the trained predictive model 264 to generate tag metadata 20 corresponding to untagged document 10. A characteristic of predictive model 264 is that given a set of feature-value pairs for a particular portion (for example, paragraph) of untagged document 10, predictive model 264 will predict how that portion of untagged document 10 should be categorized. Predictive model 264 can therefore be understood as solving a multinomial classification problem, wherein a prediction is made with respect to how each document part should be classified. With a sufficiently large corpus of training documents 50, which as a practical matter is readily available, predictive model 264 is able to predict the document part categorizations with relatively high accuracy. These predicted categorizations comprise tag metadata 20, which can be returned to document viewer 110 and applied to untagged document 10, optionally with user feedback. As illustrated in FIG. 1, the result is a tagged document 30.

Document structure analytics server 200 can communicate with client computing device 100 and other networked resources (such as document repository 500) via network 300. Network 300 may be a local area network (such as a home-based or office network), a wide area network (such as the Internet), a peer-to-peer network (such as a Bluetooth connection), or a combination of such networks, whether public, private, or both. In general, communications amongst the various entities and resources described herein may occur via wired or wireless connections, such as may be provided by Wi-Fi or cellular data networks. For example, in certain embodiments at least a portion of the functionality associated with network 300 is provided by a cellular data network, thereby making it easier for users of mobile computing devices to leverage networked resources. Thus, in such embodiments a user viewing untagged document 10 on his/her smartphone can submit document 10 to document structure analytics server 200 via a cellular data network. The user can likewise receive tag metadata 20 from server 200 via the same cellular data network. In some cases access to resources on a given network or computing system may require credentials such as a username and password, or may require compliance with any other suitable security mechanism.

The embodiments described herein can implemented in various forms of hardware, software, firmware, or special purpose processors. For example, in one embodiment a non-transitory computer readable medium has instructions encoded thereon that, when executed by one or more processors, cause aspects of document structure evaluation framework 1000 to be implemented. The instructions can be encoded using any suitable programming language, such as C, C++, object-oriented C, Java, JavaScript, Visual Basic .NET, BASIC, Scala, or alternatively, using custom or proprietary instruction sets. Such instructions can be provided in the form of one or more computer software applications or applets that are tangibly embodied on a memory device, and that can be executed by a computer having any suitable architecture. In one embodiment the system can be hosted on a given website and implemented, for example, using JavaScript or another suitable browser-based technology.

The functionalities disclosed herein can optionally be incorporated into a variety of different software applications, including word processing applications, email clients, document viewer applications, web browsers, and content management systems. The computer software applications disclosed herein may include a number of different modules, sub-modules, or other components of distinct functionality, and can provide information to, or receive information from, still other components and services. These modules can be used, for example, to communicate with input/output devices such as a display screen, a touch sensitive surface, a printer, or any other suitable input/output device. Other components and functionality not reflected in the illustrations will be apparent in light of this disclosure, and it will be appreciated that the present disclosure is not intended to be limited to any particular hardware or software configuration. Thus in other embodiments the components illustrated in FIGS. 1 and 2 may include additional, fewer, or alternative subcomponents.

The aforementioned non-transitory computer readable medium may be any suitable medium for storing digital information, such as hard drive, a server, a flash memory, RAM, or any suitable combination of the foregoing. In alternative embodiments, the computers and modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used in this regard, and that the present disclosure is not intended to be limited to any particular system architecture.

Methodology: Training a Predictive Model

FIG. 3 is a flowchart illustrating an example method 3000 for using a plurality of tagged training documents 50 to train predictive model 264. This enables predictive model 264 to subsequently be used to generate tag metadata 20 based on untagged document 10. As can be seen, method 3000 includes a number of phases and sub-processes, the sequence of which may vary from one embodiment to another. However, when considered in the aggregate, these phases and sub-processes form part of a predictive model training framework that allows document structure data to be extracted from a corpus of training documents 50. Method 3000, which in certain embodiments is responsive to user input as described herein, can be implemented using document structure evaluation framework 1000 that is illustrated in FIG. 1. However other system architectures can be used in other embodiments, as will be apparent in light of this disclosure. To this end, the correlation of the various functionalities illustrated in FIG. 3 to feature extraction sub-module 262 illustrated in FIG. 1 is not intended to imply any structural or use limitations. Rather, other embodiments may include, for example, varying degrees of integration wherein multiple functionalities are effectively performed by one resource or component. For example, in an alternative embodiment document structure analytics server 200 includes a document repository hosting a corpus of training documents, thereby allowing predictive model 264 to be trained without reference to external resources. Thus, other embodiments may have fewer or more components depending on the granularity of implementation. Numerous variations and alternative configurations will therefore be apparent in light of this disclosure.

Method 3000 commences with feature extraction sub-module 262 accessing an unanalyzed one of training documents 50. See reference numeral 3100 in FIG. 3. As illustrated in FIG. 2, in one embodiment training documents 50 comprise a plurality of tagged documents 50a, 50b, 50c, . . . that are stored in a networked document repository 500. In other embodiments training documents may be retrieved from a variety of different sources, such as from a specified list of websites with frequently updated content (for example, websites provided by newspapers, magazines, and other periodicals). Each of tagged documents 50a, 50b, 50c, . . . includes metadata that assigns a particular categorization to a particular document part. Such metadata may be provided in the form of a defined tagging structure, an existing table of contents, embedded headings, or any other construct that associates a particular categorization with a particular document part. In general, the accessed training document can be understood as comprising a plurality of document parts. Method 3000 further includes identifying an unanalyzed part of the previously accessed training document and the corresponding categorization of that document part. See reference numeral 3200 in FIG. 3. Since the training document will, in general, comprise a plurality of document parts, each associated with a corresponding categorization, the identified document part is optionally associated with an part index parameter. For example, FIG. 3 illustrates that, in one implementation, the first identified document part (part index=1) is associated with the category label "title".

Once a particular document part has been identified, the formatting associated with that document part can be analyzed and defined. More specifically, in certain embodiments feature extraction sub-module 262 generates one or more feature-value pairs that characterize the formatting associated with the identified document part. See reference numeral 3300 in FIG. 3. As illustrated, example feature-value pairs include "font=Arial" and "alignment=left". In some cases font size or other formatting parameters are defined in relative terms, such as a font size that is "larger than the following paragraph", "at least 4 points larger than the following paragraph", or "at least 10% larger than the following paragraph". Thus a single formatting parameter may be described in both absolute and relative terms, such as where the formatting parameter "font size" is characterized as one or more of "font size=12 points", "font size=smaller than preceding paragraph", and "font size=third-largest in document". The formatting information used to generate the feature-value pairs can be extracted directly from the training document itself.

Given a particular document part categorization defined within a given training document and one or more feature-value pairs associated with the characterized document part, document part feature vector 266 can be defined. In particular, method 3000 further comprises defining document part feature vector 266 that links a particular document part category with corresponding feature-value pairs. See reference numeral 3400 in FIG. 3. Thus, in the illustrated embodiment feature extraction sub-module 262 has defined document part feature vector 266 indicating that document parts in the Arial font and having left alignment suggests categorization as a "title". While the illustrated document part feature vector 266 includes only two feature-value pairs, it will be appreciated that, in general, a particular document part can be associated with an essentially unlimited quantity of feature-value pairs. Once defined, document part feature vector 266 can be stored in a repository hosted by document structure analytics module 260, as illustrated in FIG. 1. As illustrated in FIG. 2, a given tagged training document can be understood as resulting in a plurality of document part feature vectors 262.

In general, document part feature vector 266 can be defined for each of the tagged document parts comprising a given training document 50. However, not all document parts for a given training document 50 will necessarily be tagged, and thus not all document parts will necessarily yield document part feature vector 266. Once document part feature vector 266 is defined for a given document part of a given training document 50, it is determined whether that training document 50 includes additional heretofore unanalyzed tagged document parts. See reference number 3500 in FIG. 3. If so, those additional tagged document parts are analyzed in similar fashion as described above. On the other hand, if all of the tagged document parts for a given training document 50 have been analyzed, it is determined whether the corpus of training documents 50 includes additional heretofore unanalyzed training documents 50. See reference numeral 3600 in FIG. 3. If so, the document parts that comprise those additional training documents 50 are analyzed in similar fashion as described above. In general, analyzing more training documents 50 will generate more document part feature vectors 266. And training predictive model 264 with a lager quantity of document part feature vectors 266 will enable model 264 to more accurately predict the structure of untagged document 10. Once all available training documents 50 have been analyzed, method 3000 concludes. The generated document part feature vectors 266 can then be used to generate and train predictive model 264. In certain embodiments, method 3000 is invoked in response to an additional training document becoming available, thus further refining predictive model 264 even after the initial corpus of training documents 50 is analyzed, and in some cases, even after predictive model 264 is used to derive the structure of one or more untagged documents 10.

Methodology: Applying a Predictive Model

Figure 4:
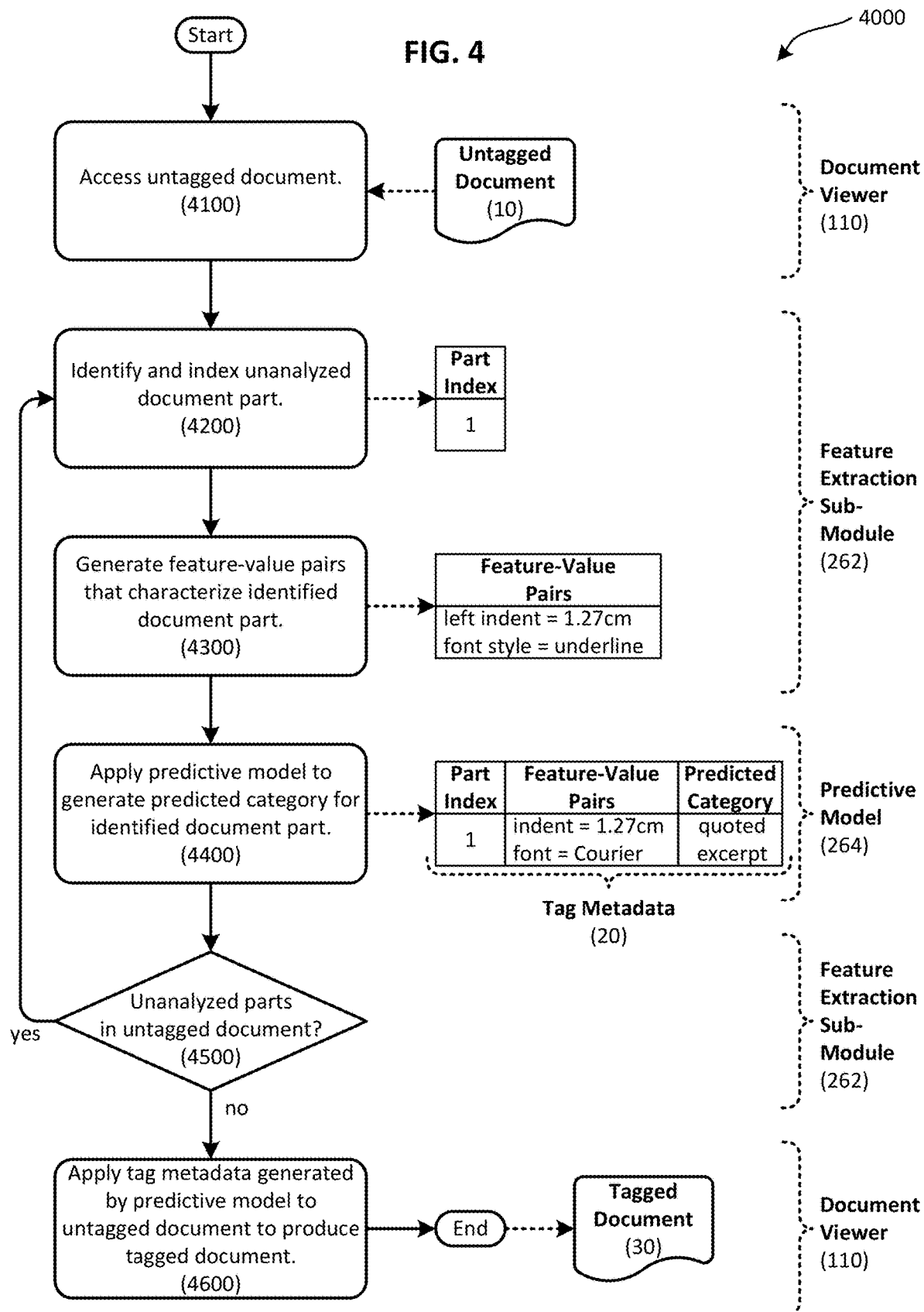
FIG. 4 is a flowchart illustrating an example method for deriving the structure of an untagged document using a predictive model that was trained based on a corpus of tagged training documents.

FIG. 4 is a flowchart illustrating an example method 4000 for deriving the structure of untagged document 10 using predictive model 264. As can be seen, method 4000 includes a number of phases and sub-processes, the sequence of which may vary from one embodiment to another. However, when considered in the aggregate, these phases and sub-processes form part of a document structure prediction framework that allows the structure of untagged document 10 to be predicted, optionally without user input. Method 4000, which in certain embodiments is responsive to user input as described herein, can be implemented using document structure evaluation framework 1000 that is illustrated in FIG. 1. However other system architectures can be used in other embodiments, as will be apparent in light of this disclosure. To this end, the correlation of the various functionalities illustrated in FIG. 4 to the specific components illustrated in FIG. 1 is not intended to imply any structural or use limitations. Rather, other embodiments may include, for example, varying degrees of integration wherein multiple functionalities are effectively performed by one resource or component. For example, in an alternative embodiment the functionality associated with feature extraction sub-module 262 is provided by a networked resource that is remotely located from document structure analytics server 200. Thus, other embodiments may have fewer or more components depending on the granularity of implementation. Numerous variations and alternative configurations will therefore be apparent in light of this disclosure.

Method 4000 commences with document viewer 110 accessing untagged document 10. See reference numeral 4100 in FIG. 4. This may occur, for example, when a user opens or otherwise identifies untagged document 10 using software such as a word processing application, a document reader application, an email client, or a web browser. In alternative embodiments method 4000 commences in response to an automated process, such as receipt of a document identified as being untagged, or a command to build a structural construct for a document identified as being untagged. Examples of structural constructs include a table of contents, a set of hierarchical bookmarks, or a document navigation structure. Once untagged document 10 is accessed or otherwise identified, feature extraction sub-module 262 identifies and optionally indexes an unanalyzed document part that comprises untagged document 10. See reference numeral 4200 in FIG. 4. The part index can be understood as a logical construct that facilitates subsequent reference to a particular document part. The formatting of the identified document part is analyzed and one or more feature-value pairs characterizing such formatting are generated. See reference numeral 4300 in FIG. 4. For example, in one embodiment untagged document 10 comprises a document part having a left indent of 1.27 cm and a font style of "underline". While this example document part illustrated in FIG. 4 is characterized in terms of two feature-value pairs, it will be appreciated that, in general, a particular document part can be associated with an essentially unlimited quantity of feature-value pairs.

After one or more feature-value pairs have been defined, predictive model 264 is applied to generate a predicted categorization for the identified document part. See reference numeral 4400 in FIG. 4. For example, in the illustrated embodiment the document part observed as having a left indent of 1.27 cm and a font style of "underline" is predicted to be characterized as a "quoted excerpt". In certain implementations a document part is characterized based in part in comparison to other related document parts. For example, a document part may be characterized as a "section title" by virtue of the fact that the font size is at least 10% larger than a preceding and following text. In another example implementation, a document part observed as having the largest font size is characterized as "title". In some cases predictive model 264 further generates a confidence level associated with its predictions. The document part characterization generated by predictive model 264 can be understood as forming tag metadata 20 which can be applied to untagged document 10, as will be described in turn. Once a predicted characterization is generated for a particular part of untagged document 10, feature extraction sub-module 262 determines whether untagged document 10 includes additional heretofore unanalyzed document parts. See reference numeral 4500 in FIG. 4. If so, those additional document parts are analyzed and characterized in similar fashion as described above. On the other hand, if all of the document parts comprising untagged document 10 have been analyzed, tag metadata 20 generated by predictive model 264 can be transmitted from document structure analytics server 200 to client computing device 100. In certain embodiments, tag metadata 20 is transmitted specifically to document viewer 110, which is configured to apply tag metadata 20 to untagged document 10, thus resulting in tagged document 30. See reference numeral 4600 in FIG. 4. At this point, method 4000 can be considered to have concluded.

Thus method 4000 can be used to characterize document parts in untagged document 10 without user intervention. This would allow, for example, a table of contents, a set of hierarchical bookmarks, or other navigation structure to be defined for untagged document 10. For example, method 4000 is capable of applying predictive model 264 to identify the various headings, sub-headings, and so forth in a given document, and then build an appropriate table of contents based on such identification. In some implementations, method 4000 is invoked automatically in response to a command to generate a table of contents or other structural construct for an untagged document.

In some cases document structure analytics server 200 may host a plurality of different predictive models 264 trained using different corpora of training documents 10. For example, because documents created by a particular software application or a particular author will often contain distinctive formatting features, different predictive models 264 associated with different software applications or different authors can be developed. Thus, if untagged document 10 is known to have been generated by a particular software application, the predictive model associated with that particular software application can be used to make predictions about the structure of that particular untagged document 10. A similar framework can be established for different document authors, wherein specific predictive models 264 are built for specific document authors. Thus, if untagged document 10 is known to have been produced by a specific document author, the predictive model associated with that particular author can be used to make predictions about the structure of that particular untagged document 10. Similarly, in some implementations different predictive models are provided based on topic keywords extracted from the document, such that, for example, a sports-based predictive model is used to analyze the structure of a document related to sports, whereas a politics-based predictive model is used to analyze the structure of a document related to politics.

Figure 5:
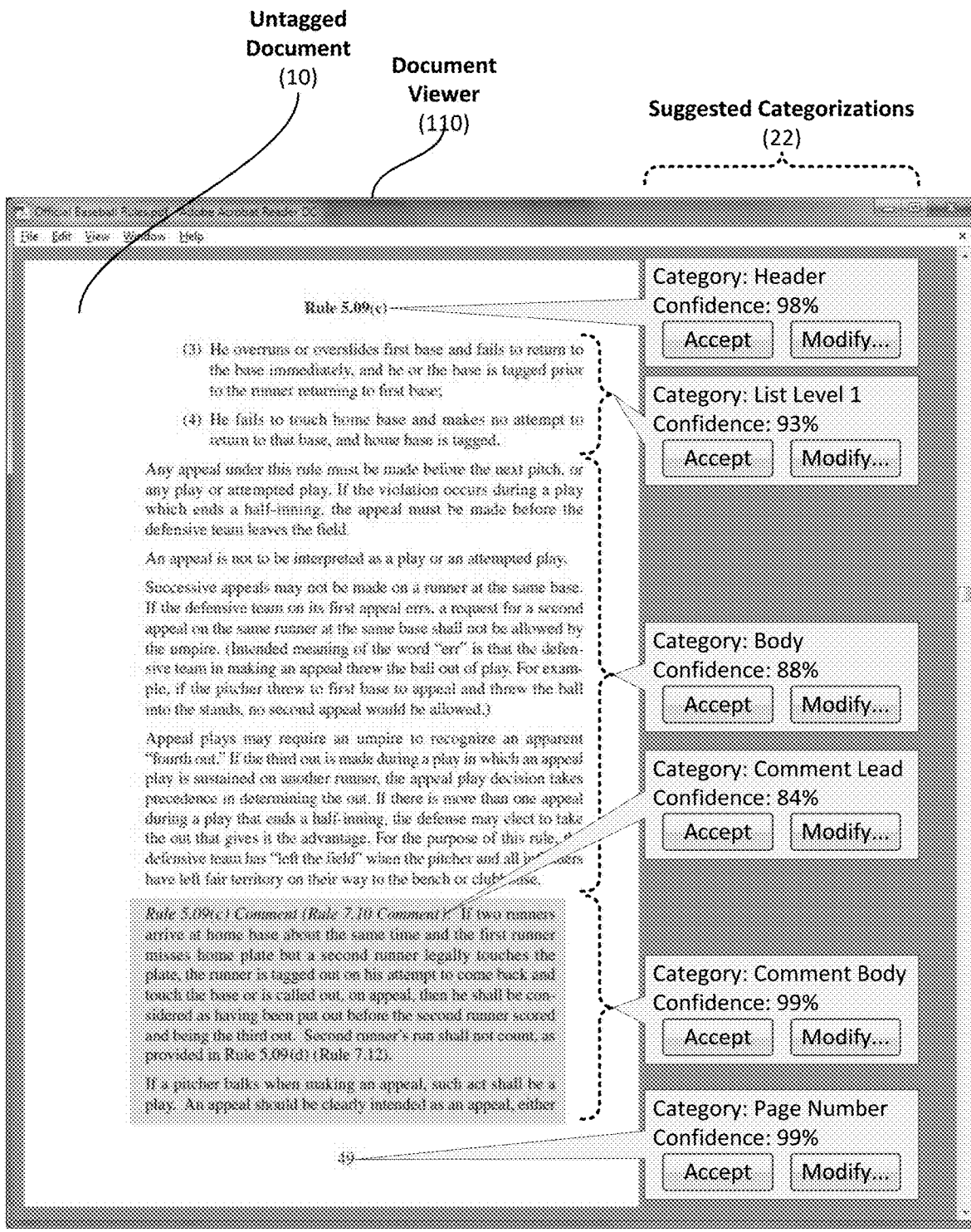
FIG. 5 is a screenshot illustrating an example user interface that is provided by a document viewer application, and that displays suggested categorizations for at least some of the document parts that comprise an untagged document.

FIG. 5 is a screenshot illustrating an example user interface 5000 that is provided by document viewer 110, and that displays suggested categorizations 22 for at least some of the document parts that comprise untagged document 10. As can be seen, certain of suggested categorizations 22 include a confidence level as well as user interface controls that allow a user to accept or modify the suggestion. If the user wishes to modify the categorization, further user interfaces that allow the user to define tags in similar fashion to existing manual tagging systems are provided. The user's feedback is optionally provided to predictive model 264, thus further refining subsequent predictions for other untagged documents. While suggested categorizations 22 are rendered in a column positioned adjacent to untagged document 10 in FIG. 5, other display techniques can be used in other embodiments, such as in popup bubbles that appear in response to the user hovering a pointing device over a particular document part. While certain implementations are more fully automated in the sense that tag metadata 20 produced by predictive model 264 are automatically incorporated into untagged document 10 (thereby producing tagged document 30), interface 5000 provides a greater degree of user control over the tagging process. In certain embodiments an adjustable configuration setting allows the user to control whether the tagging process is fully automated or subject to user feedback, as illustrated in FIG. 5.

Further Example Embodiments

Numerous variations and configurations will be apparent in light of this disclosure. For instance, one example embodiment provides a document structure extraction method. The method comprises accessing, by a document structure analytics server, an untagged document that comprises a plurality of document parts. Certain of the document parts have a visual appearance that is defined by formatting information included in the untagged document. At least two of the document parts are distinguishable from each other based on having distinctive visual appearances. The method further comprises extracting at least a portion of the formatting information from the untagged document. The method further comprises, for a particular one of the plurality of document parts, generating one or more feature-value pairs using the extracted formatting information. Each of the generated feature-value pairs characterizes the visual appearance of the particular document part by associating a particular value with a particular formatting feature. The method further comprises using a predictive model to predict a categorization for the particular document part based on the one or more feature-value pairs. The predictive model applies a machine learning algorithm to make predictions based on a collection of categorized feature-value pairs aggregated from a corpus of tagged training documents. The method further comprises defining tag metadata that associates the particular document part with the predicted categorization generated by the predictive model. In some cases one of the generated feature-value pairs associates a font size formatting feature with a particular font size value. In some cases the method further comprises (a) identifying a characteristic of the untagged document; and (b) selecting the predictive model based on the corpus of tagged training documents also having the identified characteristic. In some cases (a) accessing the untagged document further comprises receiving the untagged document from a client computing device; and (b) the method further comprises applying the tag metadata to the untagged document to produce a tagged document, and sending the tagged document to the client computing device. In some cases one of the generated feature-value pairs associates a font size formatting feature with a particular value that is selected from a group consisting of a largest font in the untagged document, an intermediate-sized font in the untagged document, and a smallest font in the untagged document. In some cases one of the generated feature-value pairs associates a font size formatting feature with a particular value that is selected from a group consisting of a font size that is larger than a preceding paragraph, a font size that is smaller than the preceding paragraph, a font size that is larger than a following paragraph, and a font size that is smaller than the following paragraph. In some cases one of the generated feature-value pairs associates a font size formatting feature with a particular value that defines a font size for a first document part in relation to a font size for a second document part. In some cases one of the generated feature-value pairs associates a particular value selected from a group consisting of left justification, center justification, right justification, and full justification with a paragraph alignment formatting feature. In some cases the method further comprises using the predictive model to determine a confidence level in the categorization for the particular document part. In some cases accessing the untagged document further comprises receiving, from a document viewer executing on a client computing device, the plurality of document parts and the formatting information. In some cases accessing the untagged document further comprises receiving, by the document structure analytics server, a plurality of untagged documents from a document management system. In some cases the method further comprises sending the tag metadata from the document structure analytics server to a client computing device, wherein the untagged document is stored at the client computing device. In some cases the method further comprises embedding the tag metadata into the untagged document to produce a tagged document, wherein sending the tag metadata to the client computing device comprises sending the tagged document to the client computing device. In some cases the method further comprises modifying the untagged document such that the visual appearance of the particular document part is further defined by the predicted categorization generated by the predictive model. In some cases one of the generated feature-value pairs associates a formatting feature with a particular value that defines the formatting feature for a first document part in relation to the formatting feature for a second document part.

Another example embodiment provides a non-transitory computer readable medium encoded with instructions that, when executed by one or more processors, cause a document structure analysis process to be invoked. The process comprises identifying a plurality of training documents. The process further comprises accessing a particular one of the training documents. The particular training document comprises a plurality of document parts. A particular one of the document parts has (a) a visual appearance defined by formatting information included in the particular training document, and (b) a document part categorization. The process further comprises generating, for the particular document part, one or more feature-value pairs using the formatting information. Each of the generated one or more feature-value pairs characterizes the visual appearance of the particular document part by correlating a particular value with a particular formatting feature. The process further comprises defining a document part feature vector that links the generated one or more feature-value pairs with the document part categorization. The process further comprises storing the document part feature vector in a memory resource hosted by a document structure analytics server. The process further comprises using the document part feature vector to train a predictive model in a supervised learning framework. The predictive model is configured to establish a predicted document part categorization based on at least one feature-value pair received from a client computing device. In some cases (a) a particular one of the generated feature-value pairs defines a proportion of the particular training document; and (b) the document part categorization is selected from a group consisting of a heading, a title, and a body paragraph. In some cases (a) the plurality of training documents are identified on the basis of a common characteristic that is selected from a group consisting of an author and a topic keyword; and (b) the predictive model is associated with the common characteristic.

Another example embodiment provides a document structure evaluation system that comprises a memory device and a processor that is operatively coupled to the memory device. The processor is configured to execute instructions stored in the memory that, when executed, cause the processor to carry out a document structure evaluation process. The process comprises displaying, in a document viewer, an untagged document that comprises a plurality of document parts. Certain of the document parts have a visual appearance that is defined by formatting information included in the untagged document. At least two of the document parts are distinguishable from each other based on having distinctive visual appearances. The process further comprises sending, to a document structure analytics server, a particular one of the document parts and formatting information that characterizes the visual appearance of the particular document part. The process further comprises receiving, from the document structure analytics server, a predicted categorization for the particular document part. The process further comprises embedding into the untagged document metadata that correlates the particular document part with the predicted categorization received from the document structure analytics server. In some cases the process further comprises (a) receiving, from the document structure analytics server, a confidence level associated with the predicted categorization; and (b) displaying, in the document viewer, the predicted categorization and the confidence level. In some cases the process further comprises (a) displaying, in the document viewer, the predicted categorization; and (b) receiving, from a user of the document viewer, an acceptance of the predicted categorization, wherein the acceptance is received before the metadata is embedded into the untagged document The foregoing disclosure has been presented for the purposes of illustration and description. It is not intended to be exhaustive or to be limited to the particular described embodiments. Many modifications and variations are possible. It is therefore intended that the scope of the invention be limited not by this detailed description, but rather by the claims appended hereto.

What is claimed is:

1. A document structure extraction method comprising:
receiving, by a document structure analytics server, an untagged document that comprises a plurality of document parts, wherein certain of the document parts have a visual appearance that is defined by formatting information included in the untagged document;
receiving, by the document structure analytics server, a command to generate a table of contents for the untagged document;
in response to receiving the command to generate the table of contents, invoking a document tagging process that comprises:
identifying a document type category to which the untagged document belongs;
extracting at least a portion of the formatting information from the untagged document;
for each of two or more of the plurality of document parts, generating one or more feature-value pairs using the extracted formatting information, wherein each of the generated feature-value pairs characterizes the visual appearance of the corresponding document part by associating a particular value with a particular formatting feature;
making a selection of a particular predictive model, from amongst a plurality of predictive models hosted by the document structure analytics server, wherein the selection is made based on the particular predictive model having been trained using a corpus of tagged training documents belonging to the identified document type category to which the untagged document belongs, and wherein each of the predictive models is configured to categorize document parts for documents sharing a common document type categorization for a respective predictive model;
using the particular predictive model to predict a categorization for each of the two or more document parts that form part of the untagged document based on the corresponding one or more feature-value pairs, wherein the particular predictive model applies a machine learning algorithm to make predictions based on a collection of categorized feature-value pairs aggregated from, and characterizing document parts included in, the corpus of tagged training documents belonging to the identified document type category; and
defining tag metadata that associates each of the two or more document parts with the corresponding predicted categorization generated by the particular predictive model;
generating the table of contents based on the defined tag metadata, wherein the table of contents correlates a document part identified as a heading by the particular predictive model with a location of the heading within the untagged document; and
modifying the untagged document to include the generated table of contents.

2. The document structure extraction method of claim 1, wherein one of the generated feature-value pairs associates a font size formatting feature with a particular font size value.

3. The document structure extraction method of claim 1, wherein
the untagged document is received from a client computing device; and
the method further comprises applying the tag metadata to the untagged document to produce a tagged document that includes the table of contents, and sending the tagged document that includes the table of contents to the client computing device.

4. The document structure extraction method of claim 1, wherein one of the generated feature-value pairs associates a font size formatting feature with a particular value that is selected from a group consisting of a largest font in the untagged document, an intermediate-sized font in the untagged document, and a smallest font in the untagged document.

5. The document structure extraction method of claim 1, wherein one of the generated feature-value pairs associates a font size formatting feature with a particular value that is selected from a group consisting of a font size that is larger than a preceding paragraph, a font size that is smaller than the preceding paragraph, a font size that is larger than a following paragraph, and a font size that is smaller than the following paragraph.

6. The document structure extraction method of claim 1, wherein the particular value defines the particular formatting feature in relation to a formatting feature for a second document part.

7. The document structure extraction method of claim 1, wherein
the particular value is selected from a group consisting of left justification, center justification, right justification, and full justification; and
the particular formatting feature is a paragraph alignment formatting feature.

8. The document structure extraction method of claim 1, the document tagging process further comprising using the particular predictive model to determine a confidence level in the categorization for at least some of the two or more document parts that form part of the untagged document.

9. The document structure extraction method of claim 1, wherein receiving the untagged document further comprises receiving, from a document viewer executing on a client computing device, the plurality of document parts and the formatting information.

10. The document structure extraction method of claim 1, wherein receiving the untagged document further comprises receiving, by the document structure analytics server, a plurality of untagged documents from a document management system.

11. The document structure extraction method of claim 1, further comprising embedding the tag metadata into the untagged document to produce a tagged document that also includes the table of contents.

12. The document structure extraction method of claim 1, further comprising
embedding the tag metadata into the untagged document to produce a tagged document that also includes the table of contents, and
sending the tagged document to a client computing device.

13. The document structure extraction method of claim 1, further comprising modifying the untagged document such that the visual appearance of at least some of the two or more document parts is further defined by the predicted categorization generated by the particular predictive model.

14. A non-transitory computer readable medium encoded with instructions that, when executed by one or more processors, cause a document structure analysis process to be invoked, the process comprising:
- identifying a plurality of training documents, each of which is associated with a particular document type category;
- accessing a particular one of the training documents, the particular training document comprising a plurality of document parts, wherein a particular one of the document parts has (a) a visual appearance defined by formatting information included in the particular training document, and (b) a document part categorization;
- generating, for the particular document part, one or more feature-value pairs using the formatting information, wherein each of the generated one or more feature-value pairs characterizes the visual appearance of the particular document part by correlating a particular value with a particular formatting feature, wherein a particular one of the generated feature-value pairs defines a proportion of content comprising the particular training document having a particular visual appearance;
- defining a document part feature vector that links the generated one or more feature-value pairs with the document part categorization, wherein the document part feature vector links
  - a feature-value pair that correlates a document part comprising 90% or more of document content with a body paragraph categorization, and
  - a feature-value pair that correlates a document part comprising less than 0.1% of document content with a title categorization;
- storing the document part feature vector in a memory resource hosted by a document structure analytics server;
- using the document part feature vector to train a particular predictive model in a supervised learning framework, wherein the particular predictive model is configured to establish a predicted document part categorization based on at least one feature-value pair received from a client computing device;
- associating the particular predictive model with the particular document type category; and
- storing the particular predictive model in the memory resource hosted by the document structure analytics server, wherein the memory resource stores a plurality of predictive models, each of which is associated with at least one of a plurality of document type categories.

15. The non-transitory computer readable medium of claim 14, wherein one of the generated feature-value pairs associates a font size formatting feature with a particular font size value.

16. The non-transitory computer readable medium of claim 14, wherein: the plurality of training documents are identified based on a common characteristic that defines the particular document type category, and that is selected from a group consisting of an author and a topic keyword.

* * * * *